United States Patent
Ibi et al.

(10) Patent No.: US 7,458,513 B2
(45) Date of Patent: Dec. 2, 2008

(54) IC CARD READING APPARATUS AND ITS RELATED METHOD

(75) Inventors: Toshiaki Ibi, Tokyo (JP); Shigeru Hashimoto, Tokyo (JP); Yoshiyasu Sugimura, Tokyo (JP)

(73) Assignee: Fujitsu Frontech Limited, Tokyo (JP)

( * ) Notice: Subject to any disclaimer, the term of this patent is extended or adjusted under 35 U.S.C. 154(b) by 0 days.

(21) Appl. No.: 11/496,732

(22) Filed: Jul. 31, 2006

(65) Prior Publication Data
US 2007/0029387 A1   Feb. 8, 2007

Related U.S. Application Data (63) Continuation of application No. PCT/JP2005/000787, filed on Jan. 21, 2005.

(30) Foreign Application Priority Data
Feb. 2, 2004   (JP)   ............................. 2004-025357

(51) Int. Cl.
G06K 7/08 (2006.01)
(52) U.S. Cl. ....................... 235/451; 235/380; 235/375; 235/449; 235/451
(58) Field of Classification Search ................. 235/380, 235/382, 375, 487, 449, 450, 451
See application file for complete search history.

(56) References Cited

U.S. PATENT DOCUMENTS 6,830,193 B2 * 12/2004 Tanaka ........................ 235/492
2005/0230475 A1 * 10/2005 Sato et al. ................... 235/451

FOREIGN PATENT DOCUMENTS

JP   2002170082   6/2002
JP   2003018043   1/2003

OTHER PUBLICATIONS

"International Search Report for Application No. PCT/JP2005/000787, Dated Mar. 1, 2005", 1 Page.
"Korean Patent Application No. 10-2006-7017581, Office Action mailed Feb. 21, 2008", (w/ English Translation),6 pgs.

* cited by examiner

*Primary Examiner*—Karl D. Frech
(74) *Attorney, Agent, or Firm*—Schwegman, Lundberg & Woessner, P.A.

(57) ABSTRACT

One purpose is to provide a user friendly IC card reading apparatus conforming to different communication standards. A linear power amplifier supplies an antenna circuit with a power source voltage for Type A which is supplied from a power supply switching circuit when transmitting a radio signal of Type A, while supplying the antenna circuit with a power source voltage for Type B which is supplied from the power supply switching circuit when transmitting a radio signal of Type B, based on the instructions of a CPU. This makes it possible to read out of IC cards of both Type A and Type B.

18 Claims, 5 Drawing Sheets

| ATTENUATOR (ATT) VOLTAGE (V) | OPERATING MAGNETIC FIELD STRENGTH (DEPENDING ON ATTENUATOR VOLTAGE) | COMMUNICATION DISTANCE WITH A CARD (DEPENDING ON MAGNETIC FIELD STRENGTH, READ/WRITE SPECIFICATION AND PERFORMANCE, AND CARD SPECIFICATION) | |
|---|---|---|---|
| | | Type A | Type B |
| 0.5 | 1A/m | 50mm | 10mm |
| 1 | 2A/m | 70mm | 40mm |
| 1.5 | 3A/m | 90mm | 50mm |
| 2 | 4A/m | 100mm | 60mm |
| 2.5 | 5A/m | 110mm | 70mm |

IC CARD READING APPARATUS AND ITS RELATED METHOD

CROSS REFERENCE TO RELATED APPLICATION

This application is a continuation under 35 U.S.C. 111(a) of PCT/JP2005/000787, filed Jan. 21, 2005 and published as WO 2005/074158 A1, filed Aug. 11, 2005, which claimed priority under 35 U.S.C. 119 to Japanese Application No. 2004-025357, filed Feb. 2, 2004, which applications and publication are incorporated herein by reference and made a part hereof.

BACKGROUND OF THE INVENTION

1. Field of the Invention

The present invention relates to an IC card reading apparatus, and its related method, for reading out of, or writing in, an IC card in a noncontact manner.

2. Description of the Related Art

Use of IC cards has become increasingly popular as prepaid cards for public phones and railways, in place of magnetic cards.

The IC cards are categorized as two types, i.e., a contact and noncontact types, with the use of the noncontact type IC card (simply "noncontact IC card" hereinafter), which supplies the IC card with power wirelessly, having been in advance. The noncontact IC cards can be categorized as three types, i.e., a close coupling type, proximity type and vicinity type, depending on the communicable distance ranges. Widely used proximity type IC cards are ISO Type A and Type B (Type A and Type B according to ISO 14443).

A dedicated communication-use IC conforming to the Type A or Type B communication standards has already been developed, and an IC card reading and writing apparatus using the communication-use IC has been put in use.

A patent document, laid-open Japanese application publication No. 2002-170082, has disclosed a technique for detecting a signal intensity of a signal received from an IC card and changing wireless transmission power in accordance with the detected signal intensity.

While a dedicated apparatus capable of reading and writing an IC card conforming to a specific communication standard has been put in use as described above, a readout apparatus for IC cards conforming to different communication standards has not been accomplished.

The communication distance between an IC card and a read/write apparatus is different stemming from the differences in the communication standards or the specification and performance of a control part including the IC card, e.g., the communication distance of 2 cm for Type A, while 10 cm for Type B. Therefore, if a read/write apparatus is designed by using a communication-use IC confirming to a specific communication standard, it is possible to transmit a signal by a most optimal transmission power to an IC card conforming to a single communication standard, while it is not possible to transmit a signal by a most optimal transmission power to an IC card conforming to a different communication standard, hence having precluded accomplishment of an IC card reading apparatus that will be convenient for users when using IC cards conforming to various communication standards.

SUMMARY

The challenge of the present invention is to provide a user friendly IC card reading apparatus conforming to different communication standards.

An IC card reading apparatus according to an embodiment of the present invention includes one or plural communication control circuits for controlling a transmission to, and receiving from, IC cards conforming to a plurality of communication standards; an antenna circuit for exchanging a radio signal; a transmission power supply circuit for supplying the antenna circuit with transmission power applicable to a communication standard of IC card as the subject of reading out thereof; and a control unit for instructing the transmission power supply circuit to supply transmission power applicable to any one of the plurality of communication standards.

This embodiment of invention makes it possible to accomplish a user friendly reading apparatus capable of reading out of IC cards conforming to different communication standards.

Figure 1:
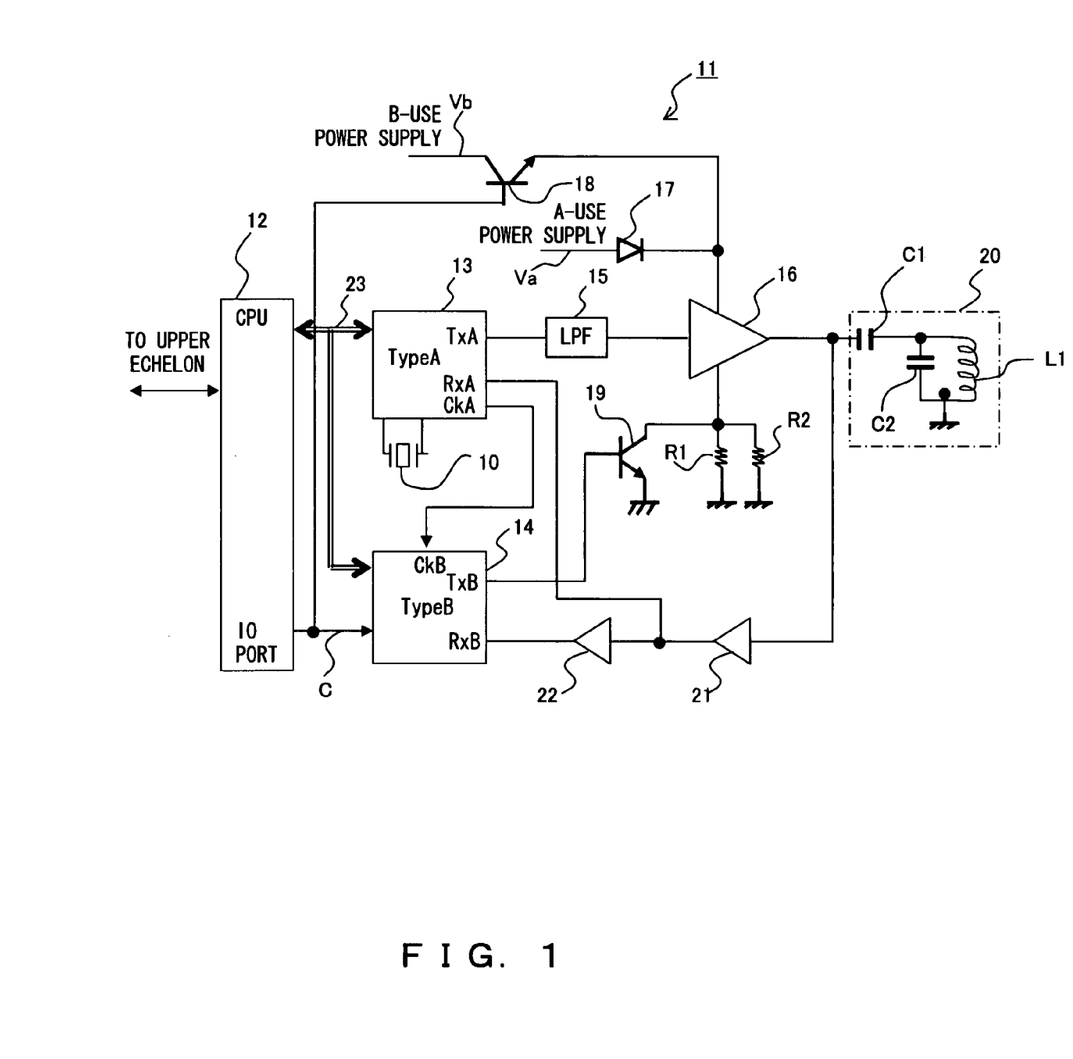
FIG. 1 is a circuit diagram of an IC card reading apparatus according to a first embodiment.
Figure 3:
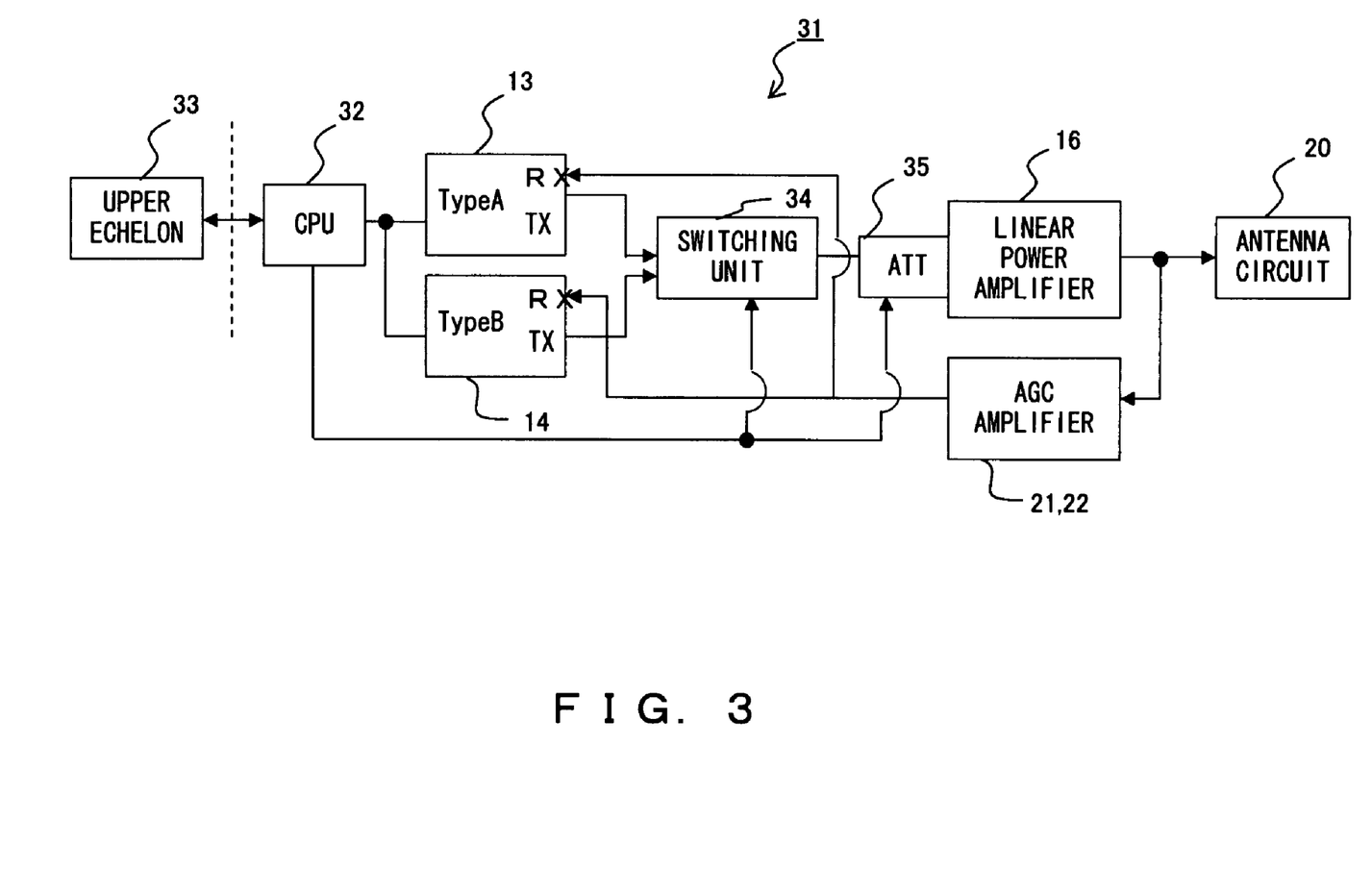
FIG. 3 is a block diagram of an IC card reading apparatus according to a second embodiment.

The communication control circuits correspond to communication control circuits 13 and 14 shown by FIG. 1, the transmission power supply circuit corresponds to a diode 17, transistor 18 and linear power amplifier 16 shown by FIG. 1, or to the attenuator 35 and linear power amplifier 16 shown by FIG. 3.

In the above described embodiment of the invention in another aspect of the present invention is the IC card reading apparatus, the control unit instructs the transmission power supply circuit to supply transmission power so as to make communication distances with IC cards conforming to different communication standards approximately the same based on data with regard to a predetermined voltage or power and a communication distance of each communication standard corresponding to the voltage or power when reading out of IC cards conforming to different communication standards.

Such a configuration makes it possible to read out of IC cards conforming to various communication standards approximately in the same communication distance, hence improving the IC card user convenience.

In another aspect of the present invention, the communication control circuits, at least constituted by first and second communication control circuits conforming to first and second communication standards, synchronize a phase of transmission signal of the first communication control circuit with that of transmission signal of the second communication control circuit.

Such a configuration enables the reduction of a noise occurring when switching from a transmission signal conforming to the first communication standard to the one confirming to the second communication standard and of a noise between a transmission and receiving signals.

In yet another aspect of the present invention, the control unit instructs the transmission power supply circuit to supply transmission power applicable to a communication standard with transmission power being largest among the plurality of communication standards at the time of the first reading, continues to read out of the IC card if a signal received from the IC card conforms to a communication standard of a transmission signal, while instructing the transmission power supply circuit to supply transmission power applicable to a communication standard with transmission power being second from largest if the signal received from the IC card does not conform to a communication standard of a transmission signal.

Such a configuration puts a priority in reading an IC card conforming to a communication standard with large transmission power, thereby improving a success rate of reading the IC card.

DESCRIPTION OF THE PREFERRED EMBODIMENTS

The following is a detailed description of the preferred embodiment of the present invention while referring to the accompanying drawings. FIG. 1 is a circuit diagram of an IC card reading apparatus (i.e., reading and writing apparatus) 11 according to the first embodiment.

In FIG. 1, a CPU (i.e., a control unit; central processing unit) 12, comprising a 32-bit general purpose CPU for example, is a processor for carrying out an interface control with an upper echelon apparatus and switching transmission power. The IC port of the CPU 12 outputs to the base of a transistor 18 and a communication control circuit 14 a switching signal for switching a transmission and receiving of Type A and Type B signals.

The communication control circuits 13 and 14 are communication control-use IC for engaging in a transmission and receiving controls conforming to respectively different communication standards, with the communication control circuit 13 engaging in a communication control conforming to the communication standard per ISO 14443—Type A, while the communication control circuit 14 engaging in a communication control conforming to the communication standard per ISO 14443—Type B.

A reference clock signal (e.g., a 13.56 MHz signal) of a crystal oscillator 10 is supplied to the communication control circuit 13 which internally generates a Type A-use synchronous carrier clock CA synchronously with the phase of the reference clock signal, thus generating a transmission signal for the Type A at a timing synchronous with the synchronous carrier clock CA and outputting by way of an output terminal TxA. The synchronous carrier clock CA is output to a clock terminal CKB of the communication control circuit 14 by way of a clock terminal CKA.

The communication control circuit 14 generates a Type B-use synchronous carrier clock CB synchronous with the Type A-use synchronous carrier clock CA input in the clock terminal CKB and generates a transmission signal for the Type B at timing synchronous with the synchronous carrier clock CB to output by way of an output terminal TxB.

Over at the IC card, a transmission-use clock signal is generated from the received radio signal, and therefore a signal transmitted from the IC card is synchronized with the Type A-use synchronous carrier clock CA generated by the IC card reading apparatus 11.

By this configuration, the Type A-use synchronous carrier clock CA is in the same phase with the Type B-use synchronous carrier clock CB and also the phase of radio signal transmitted from the Type-A IC card or the Type B IC card is in the same phase. As a result, it is possible to reduce a noise generated by a shift of phase between two signals when the IC card reading apparatus 11 switches transmission signals from the Type A to Type B, or vice versa. And the phase of a signal transmitted over from IC card is the same as that of the synchronous carrier clocks CA and CB, thereby reducing a noise generated by a phase difference between the internal clock and the received signal.

A low-pass filter (LPF) 15 converts a rectangular wave signal output from the communication control circuit 13 into a sign wave signal to output to a linear power amplifier 16.

The communication control circuit 14 outputs a signal conforming to the ISO14443—Type B to the base of a transistor 19 by way of the output terminal TxB. The collector of the transistor 19 is connected by resistors R1 and R2 in parallel, by way of which a signal is output to the linear power amplifier 16.

The linear power amplifier 16 is supplied by an A-use power supply voltage Va, by way of the diode 17, for supplying the transmission power applicable to the Type A communication standard and by a Type B-use power supply voltage Vb, by way of the transistor 18, for supplying the transmission power applicable to the Type B communication standard.

Since the relationship between the Type A-use power supply voltage Va and Type B-use power supply voltage Vb is in Va<Vb, turning on the transistor 18 in the state of supplying the voltage Va enables a supply of the voltage Vb from the Type A-use power supply to the linear power amplifier 16 necessary for transmitting a Type B signal.

The linear power amplifier 16 selects either a type A signal output from the communication control circuit 13 or a Type B signal output from the communication control circuit 14 to output to an antenna circuit 20. The linear power amplifier 16 supplies the antenna circuit 20 with the Type A-use power supply voltage Va which is provided by way of the diode 17 when outputting a Type A signal. And the linear power amplifier 16 supplies the antenna circuit 20 with the Type B-use power supply voltage Vb which is provided by way of the transistor 18 when supplying a Type B signal.

The antenna circuit 20, comprising a capacitor C1 connected with a signal path in series, and a coil L1 and a capacitor which are connected in parallel, converts an input signal into a radio signal to emit out to the air.

Figure 2:
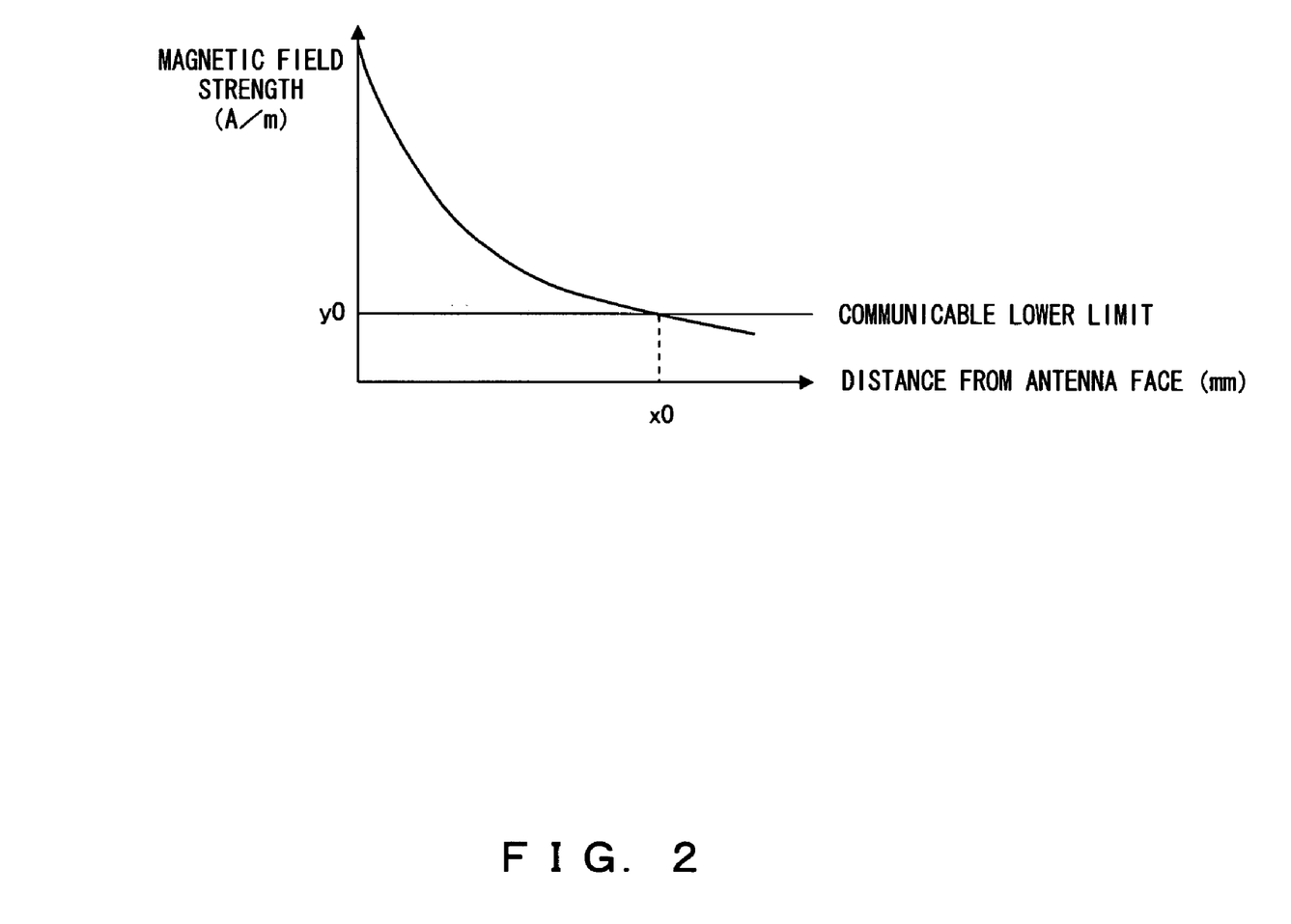
FIG. 2 shows a magnetic field strength in terms of distance from an antenna.

FIG. 2 shows the characteristic of a magnetic field strength in terms of distance from an antenna face when a radio signal is transmitted from the antenna circuit 20 in a certain signal power. In FIG. 2, the horizontal axis represents the distance (mm) from the antenna face, while the vertical axis represents the magnetic field strength (A/m) at a given point.

Assuming the lowest limit value of the magnetic field strength is y0 for enabling a communication between an IC card and an IC card reading apparatus 11 when transmitting a radio signal at a certain transmission power, the communication becomes disabled when the distance between the antenna emission face of the antenna circuit 20 and the IC card becomes larger than x0. Note that the communicable distance becomes larger with the transmission power of the antenna circuit 20.

The first embodiment is configured to design the characteristic of the transmission power supplied from the linear power amplifier 16 to antenna circuit 20 so as to make the communication distance for transmitting a shorter communication range Type B signal the same as that for the Type A, in order to make the communication distance for the Type A IC card the same as that for the Type B IC card. In order to accomplish the same communication distance between the Type A and Type B, the power supply voltage supplied to the linear power amplifier 16 needs to be adjusted, and accordingly the present embodiment accomplishes it by setting the Type A-use power supply voltage Va at approximately 4 volts; and the Type B-use power supply voltage Vb at approximately 4.5 volts.

An automatic gain control circuit (AGC) 21 amplifies a signal received at the antenna circuit 20 to a signal level conforming to the Type A communication standard to output to the communication control circuit 13.

An automatic gain control circuit (AGC) 22 amplifies the signal amplified by the AGC 21 to a signal level conforming to the Type B communication standard to output to the communication control circuit 14.

The next description is of an operation of the IC card reading apparatus 11 configured as described above. When reading a Type A IC card, the CPU 12 outputs a switching signal C (e.g., a low level signal) for instructing a transmission and receiving of a Type A signal to the base of the transistor 18 and the communication control circuit 14.

The communication control circuit 14, having received the low level switching signal C stops output of a transmission signal out of the output terminal TxB. The linear power amplifier 16 supplies the antenna circuit 20 with the Type A-use power supply voltage Va output from the diode 17 and at the same time outputs the Type A signal output from the communication control circuit 13 to the antenna circuit 20.

When reading a Type B IC card, the CPU 12 outputs a switching signal C (e.g., a high level signal) for instructing a transmission and receiving of a Type B signal.

Having received the high level switching signal C, the communication control circuit 14 outputs a Type B signal to the base of the transistor 19 which then amplifies the signal to supply the linear power amplifier 16 which in turn outputs a signal by supplying the antenna circuit 20 with a Type B-use transmission power. As a result, the antenna circuit 20 emits a Type B radio signal to the air.

The signal received at the antenna circuit 20 is amplified by the AGCs 21 and 22, converted to a Type A signal level and Type B signal level, and output to the communication control circuits 13 and 14, respectively. The communication control circuits 13 and 14 then convert the received signals to predetermined length data to output to a data bus 23.

The CPU 12 analyzes information, output from the communication control circuits 13 and 14, which shows an IC card type and confirms as to whether the correspondent is a Type A IC card or Type B IC card. And the CPU 12 carries out communication according to a communication standard which the IC card as the subject of reading conforms to.

The above-described first embodiment is configured to switch voltages provided to the linear power amplifier 16 and change transmission power (i.e., radio frequency power), which is supplied from the linear power amplifier 16 to antenna circuit 20, to the levels of power applicable to the respective communication standards, thereby enabling the single IC card reading apparatus 11 to read out of IC cards conforming to different communication standards; and also to write data therein.

It is further configured to synchronize a synchronous carrier clock CB, which becomes a reference when generating a Type B signal, with a Type A synchronous carrier clock CA, which is another communication standard, thereby making the phases of both signals identical and reducing occurrence of a noise even when switching signals from the Type A to Type B, or switching signals from Type B to Type A. Furthermore, the CPU built-in in an IC card generates a transmission-use clock signal from the received radio signal, thereby enabling the phase of a radio signal transmitted from the IC card reading apparatus 11 to be identical with that of a radio signal transmitted from the IC card. This makes it possible to reduce a noise generated by the displacement of phases between the received signal and internal clock.

Also, the use of an existing communication control-use IC, which has an actual usage, for the communication control circuits 13 and 14 makes it possible to reduce the development cost of the apparatus and the product cost, and accomplish a highly reliable apparatus.

Next, FIG. 3 is a block diagram of an IC card reading apparatus 31 according to a second embodiment. The configuration of the IC card reading apparatus 31 according to the second embodiment is basically the same as the IC card reading apparatus 11 according to the first embodiment and therefore the same number is assigned to the same function where the description is omitted here.

Where the IC card reading apparatus 31 according to the second embodiment differs from the first embodiment is that the CPU 32 switches the transmission signals between the Type A and Type B by controlling a switching unit 34 and controls transmission power by switching voltages of an attenuator 35.

Referring to FIG. 3, the CPU 32 controls an interface unit for exchanging data with an upper echelon apparatus 33, switching of a switching unit and an output voltage of an attenuator (ATT) 35.

The switching unit 34 selects either one of output signals from the communication control circuits 13 and 14 according to instructions from the CPU 32 to output to the attenuator 35.

The A attenuator 35 outputs a predetermined voltage to the linear power amplifier 16 according to instructions from the CPU 32.

The linear power amplifier 16 amplifies the power of a transmission signal output from the communication control circuits 13 or 14 to output to the antenna circuit 20.

Figure 4:
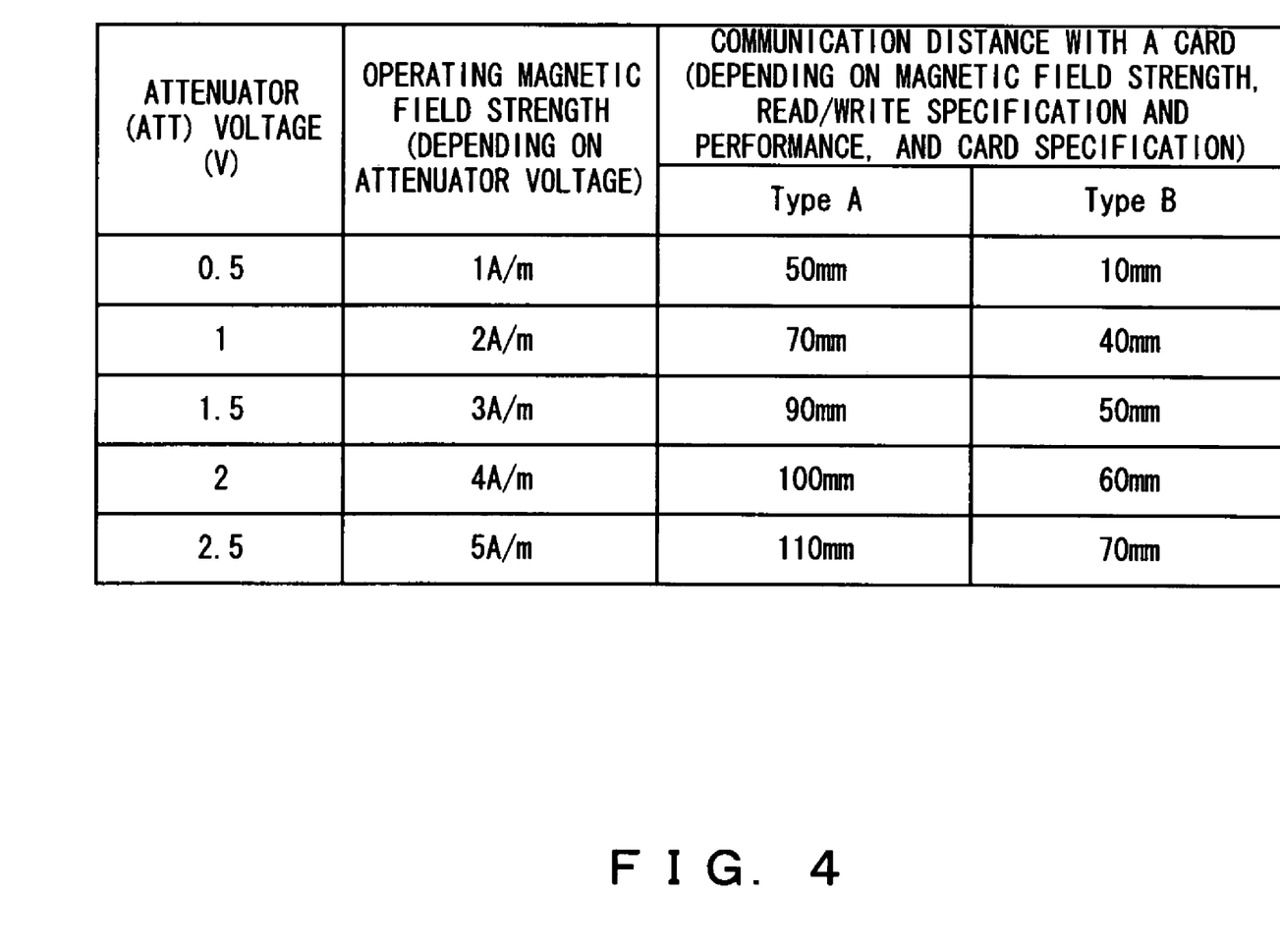
FIG. 4 is a table showing the relationship among an attenuator voltage, magnetic field strength and communication distance.

The next description is of the relationship among the output voltage of the attenuator 3, operating magnetic strength of a radio signal emitted from the antenna circuit 20 and communication distance of an IC card by referring to FIG. 4.

As shown by FIG. 4, when the output voltage of the attenuator 35 is 1 volt, the magnetic field strength of a radio signal output from the antenna circuit 20 is 2 A/m under which condition the communication distance with a Type A IC card is 70 mm and that with a Type B IC card is 40 mm. Meanwhile, when the output voltage of the attenuator 35 is 2.5 volts, the magnetic field strength of a radio signal output from the antenna circuit 20 is 5 A/m, under which condition the communication distance with a Type A IC card is 110 mm and that with a Type B IC card is 70 mm.

Therefore, setting the output voltage of the attenuator 35 at 1 volt secures the communication distance of 70 mm for a Type A IC card, while setting the output voltage of the attenuator 35 at 2.5 volts secures the communication distance of 70 mm for a Type B IC card.

When reading out of a Type A IC card, the CPU 32 outputs a switching signal to the switching unit 34 for instructing to select a Type A signal output from the communication control circuit 13 and at the same time outputs a signal to the attenuator 35 for instructing to set the output voltage at 1 volt. These signals are output by using a plurality of I/O ports comprised by the CPU 32.

As a result, the antenna circuit 20 emits a radio signal of the magnetic field strength of 1 A/m, thereby enabling communication with a Type A IC card in the distance of 70 mm.

When reading out of a Type B IC card, the CPU 32 outputs a switching signal to the switching unit 34 for instructing to select a Type B signal output from the communication control circuit 14 and at the same time outputs a signal to the attenuator 35 for instructing to set the output voltage at 2.5 volts.

As a result, the antenna circuit 20 emits a radio signal of the magnetic field strength of 2.5 A/m, thereby enabling communication with a Type B IC card in the distance of 70 mm.

According to the above described second embodiment, the CPU 32 controls the output of the attenuator 35, thereby enabling a control of the transmission voltage supplied from the linear power amplifier 16 to antenna circuit 20. This makes it possible to adjust the magnetic field strength of a radio signal emitted from the antenna circuit 20 to establish the same communication distance for IC cards conforming to different communication standards.

The establishment of the same communication distance for IC cards conforming to different communication standards enables the user to carry out IC card reading always in the same distance without ever being conscious about the type of a using IC card when carrying out an IC card reading, thereby reducing a sense of discomfort in the user operation and accomplishing a convenient IC card reading apparatus.

Figure 5:
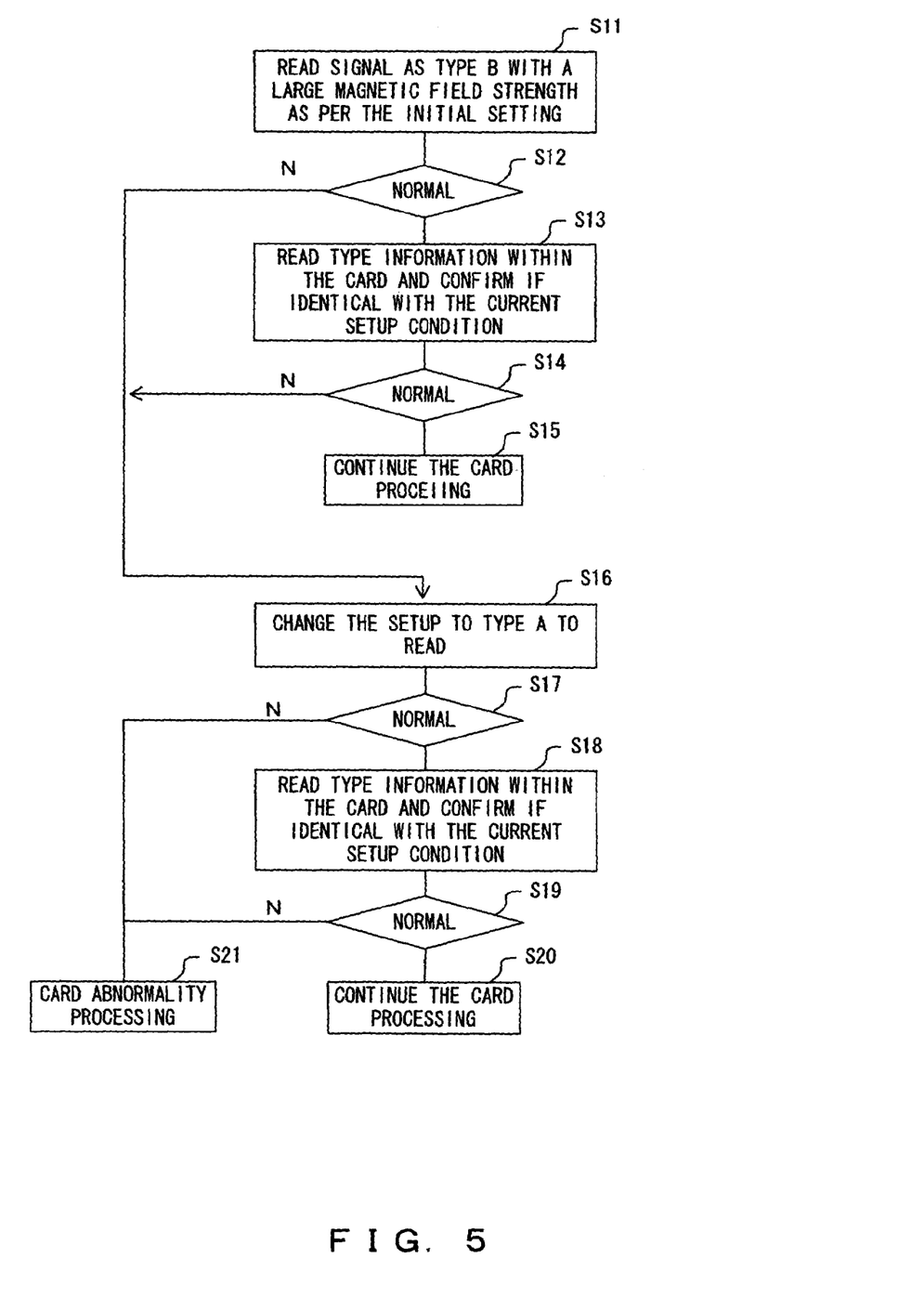
FIG. 5 is a flow chart of IC card reading processing according to a third embodiment.

Next, FIG. 5 is a flow chart of IC card reading processing according to a third embodiment of the present invention.

The third embodiment exemplifies a reading by judging a type of an IC card when the type (i.e., a conforming communication standard) of an IC card as the subject of reading is not known beforehand. The following processing is carried out by the CPU 32 for example.

The IC card reading apparatus 31 according to the third embodiment is configured as setting so as to transmit a Type B radio signal with a large magnetic field strength by the initial setting. In an IC card, a circuit is operated by power supplied by the received radio signal so as to transmit a radio signal based on a communication standard (i.e., Type A or Type B) which the IC card conforms to.

The CPU 32, assuming that an IC card as the subject of reading is a Type B IC card, has a signal received at an antenna circuit 20 output to a communication control circuit 14 and read data output from the communication control circuit 14 as Type B data (S11 shown in FIG. 5), followed by judging whether or not the received data has been read normally (S12 in FIG. 5).

If the received data has been normally read (S12 in FIG. 5), proceed to step S13 and read type information of the IC card. Then judge whether or not the readout IC card type information is identical with the initially set communication standard (i.e., Type B in this case) (S14 in FIG. 5). Here, the reason why the type information is confirmed is to prevent data from being read out if the IC card type is different.

If the initially set communication standard and the IC card type information are identical ("yes" for S14), the subject IC card is judged as a Type B IC card, followed by carrying out communication by transmission power applicable to the Type B communication standard to continue the card reading and writing processing (S15 in FIG. 5).

If the judgment for S 12 is that the received signal has been normally read ("no" for S12), or the judgment for S14 is that the card type information recorded within the IC card and the transmitted signal type are different ("no" for S14), then proceed to the step S16 and transmit a radio signal applicable to the Type A with a small magnetic field strength to read the received signal as a Type A signal. And judge whether or not the received signal has been read normally as a Type A signal (S17 in FIG. 5).

If the received signal has been read normally as a Type A signal ("yes" for S17), proceed to the step S18 and read the type information recorded within the IC card. And judge whether of not the type information recorded within the IC card is identical with the received signal type (i.e., Type A in this case) (S19 in FIG. 5).

If the type information is identical ("yes" for S19), proceed to the step S20 and continue a data reading and writing processing for the IC card by using the radio signal applicable to the Type A with a small magnetic field strength.

In the step S17, if the data has not been read normally ("no" for S17), or the judgment is that the IC card type information is not identical ("no" for S19), proceed to the step S21 to carry out a card abnormality processing.

The above described third embodiment is configured to transmit a radio signal by transmission power applicable to the Type B with a large magnetic field strength first, thereby increasing a probability of reading a radio signal transmitted from an IC card and improving a success rate of reading it.

The present invention may be configured as follows, in lieu of being limited by the above described present embodiments:

(1) If a single communication control-use IC conforming to a plurality of communication standards is put into practice, a circuit may be structured by using such a single IC, instead of using two communication control-use IC as with the configuration of the present embodiments;

(2) The present invention can be applied to any communication standards which concern with noncontact type IC cards, in lieu of being limited by the Type A and Type B; or (3) A circuit for making transmission power variable may use a variable power source, switching regulator, et cetera, instead of being limited by an attenuator.

The present invention makes it possible to read IC cards conforming to different communication standards and therefore accomplish a user friendly IC card reading apparatus; and further establish the same communication distance for IC cards conforming to different communication standards, thereby eliminating a sense of discomfort in the operation in which the distances for reading IC cards have to be changed when the users let the IC cards be read.

All documents, patents, and other references listed above are hereby incorporated by reference for any purpose.

What is claimed is:

1. An IC card reading apparatus comprising,
one or plural communication control circuits for controlling a transmission to, and receiving from, IC cards conforming to a plurality of communication standards;
an antenna circuit for exchanging a radio signal;
a transmission power supply circuit for supplying the antenna circuit with transmission power applicable to a communication standard of IC card as the subject of reading out thereof; a control unit for instructing the transmission power supply circuit to supply transmission power applicable to any one of the plurality of communication standards; and
wherein said communication control circuits, at least constituted by first and second communication control circuits conforming to first and second communication standards, synchronize a phase of transmission signal of the first communication control circuit with a phase of transmission signal of the second communication control circuit.

2. The IC card reading apparatus according to claim 1, wherein said control unit instructs said transmission power supply circuit to supply transmission power so as to make communication distances with IC cards conforming to different communication standards approximately the same, based on data with regard to a predetermined voltage or power and a communication distance of each communication standard corresponding to the voltage or power when reading out of IC cards conforming to different communication standards.

3. The IC card reading apparatus according to claim 1, wherein said transmission power supply circuit comprises a diode connected to a first voltage source, a transistor connected to a second voltage source, and a linear power amplifier connected to the diode and the transistor.

4. The IC card reading apparatus according to claim 3, wherein the first voltage is 4 volts, and wherein the second voltage is approximately 4.5 volts.

5. The IC card reading apparatus according to claim 4, wherein the transmission power supply circuit includes an automatic gain control circuit to amplify a signal received at the antenna circuit.

6. An IC card reading apparatus comprising,
one or plural communication control circuits for controlling a transmission to, and receiving from, IC cards conforming to a plurality of communication standards;
an antenna circuit for exchanging a radio signal;
a transmission power supply circuit for supplying the antenna circuit with transmission power applicable to a communication standard of IC card as the subject of reading out thereof; a control unit for instructing the transmission power supply circuit to supply transmission power applicable to any one of the plurality of communication standards;
wherein said control unit instructs said transmission power supply circuit to supply transmission power so as to make communication distances with IC cards conforming to different communication standards approximately the same, based on data with regard to a predetermined voltage or power and a communication distance of each communication standard corresponding to the voltage or power when reading out of IC cards conforming to different communication standards; and
wherein said communication control circuits, at least constituted by first and second communication control circuits conforming to first and second communication standards, synchronize a phase of transmission signal of the first communication control circuit with a phase of transmission signal of the second communication control circuit.

7. The IC card reading apparatus according to claim 6, wherein said transmission power supply circuit comprises a diode connected to a first voltage source, a transistor connected to a second voltage source, and a linear power amplifier connected to the diode and the transistor.

8. The IC card reading apparatus according to claim 7, wherein the first voltage is 4 volts, and wherein the second voltage is approximately 4.5 volts.

9. The IC card reading apparatus according to claim 6, wherein the transmission power supply circuit includes an automatic gain control circuit to amplify a signal received at the antenna circuit.

10. An IC card reading apparatus, comprising,
one or plural communication control circuits for controlling a transmission to, and receiving from, IC cards conforming to a plurality of communication standards;
an antenna circuit for exchanging a radio signal;
a transmission power supply circuit for supplying the antenna circuit with transmission power applicable to a communication standard of IC card as the subject of reading out thereof; a control unit for instructing the transmission power supply circuit to supply transmission power applicable to any one of the plurality of communication standards; and
wherein said control unit instructs said transmission power supply circuit to supply transmission power applicable to a communication standard with transmission power being largest among said plurality of communication standard at the time of the first reading, continues to read out of said IC card if a signal received from the IC card conforms to a communication standard of a transmission signal, while instructing the transmission power supply circuit to supply transmission power applicable to a communication standard with transmission power being second from largest if the signal received from the IC card does not conform to a communication standard of a transmission signal.

11. The IC card reading apparatus according to claim 10, wherein said control unit instructs said transmission power supply circuit to supply transmission power so as to make communication distances with IC cards conforming to different communication standards approximately the same, based on data with regard to a predetermined voltage or power and a communication distance of each communication standard corresponding to the voltage or power when reading out of IC cards conforming to different communication standards.

12. The IC card reading apparatus according to claim 11, wherein said transmission power supply circuit comprises a diode connected to a first voltage source, a transistor connected to a second voltage source, and a linear power amplifier connected to the diode and the transistor.

13. The IC card reading apparatus according to claim 12, wherein the first voltage is 4 volts, and wherein the second voltage is approximately 4.5 volts.

14. The IC card reading apparatus according to claim 13, wherein the transmission power supply circuit includes an automatic gain control circuit to amplify a signal received at the antenna circuit.

15. An IC card reading method, comprising:
controlling a transmission to, and receiving from, IC cards conforming to a plurality of communication standards;
instructing the transmission power supply circuit, which supplies an antenna circuit for carrying out a transmission and receiving of radio signal with transmission power applicable to a communication standard of an IC card as the subject of reading out thereof, to supply transmission power applicable to any one of the plurality of communication standards; and
instructing said transmission power supply circuit to supply transmission power so as to make communication distances with IC cards conforming to different communication standards approximately the same, based on data with regard to a predetermined voltage or power and a communication distance of each communication standard corresponding to the voltage or power when reading out of IC cards conforming to different communication standards.

16. An IC card reading method, comprising:
controlling a transmission to, and receiving from, IC cards conforming to a plurality of communication standards;
instructing the transmission power supply circuit, which supplies an antenna circuit for carrying out a transmission and receiving of radio signal with transmission power applicable to a communication standard of an IC card as the subject of reading out thereof, to supply transmission power applicable to any one of the plurality of communication standards; and
having at least first and second communication control circuits conforming to first and second communication standards, and synchronizing a phase of transmission signal of the first communication control circuit with a phase of transmission signal of the second communication control circuit.

17. An IC card reading method, comprising:
controlling a transmission to, and receiving from, IC cards conforming to a plurality of communication standards;
instructing the transmission power supply circuit, which supplies an antenna circuit for carrying out a transmission and receiving of radio signal with transmission power applicable to a communication standard of an IC card as the subject of reading out thereof, to supply transmission power applicable to any one of the plurality of communication standards; and instructing said transmission power supply circuit to supply transmission power applicable to a communication standard with transmission power being largest among said plurality of communication standards at the time of the first reading, continuing to read out of said IC card if a signal received from the IC card conforms to a communication standard of a transmission signal, while instructing the transmission power supply circuit to supply transmission power applicable to a communication standard with transmission power being second from largest if the signal received from the IC card does not conform to a communication standard of a transmission signal.

18. An IC card reading apparatus, comprising:

one or plural communication control circuits for controlling a transmission to, and receiving from, IC cards conforming to a plurality of communication standards;

an antenna circuit for exchanging a radio signal;

a transmission power supply circuit for supplying the antenna circuit with transmission power applicable to a communication standard of IC card as the subject of reading out thereof; and a control unit for instructing the transmission power supply circuit to supply transmission power applicable to any one of the plurality of communication standards, wherein said control unit instructs said transmission power supply circuit to supply transmission power so as to make communication distances with IC cards conforming to different communication standards approximately the same, based on data with regard to at least one of a voltage and a power and a communication distance of each communication standard corresponding to the one voltage and power when reading out of IC cards conforming to different communication standards, and wherein said control unit instructs said transmission power supply circuit to supply transmission power applicable to a communication standard with transmission power being largest among said plurality of communication standards at the time of the first reading, continues to read out of said IC card if a signal received from the IC card conforms to a communication standard of a transmission signal, while instructing the transmission power supply circuit to supply transmission power applicable to a communication standard with transmission power being second from largest if the signal received from the IC card does not conform to a communication standard of a transmission signal.

* * * * *